(12) United States Patent
Vuorikari et al.

(10) Patent No.: US 7,740,808 B2
(45) Date of Patent: Jun. 22, 2010

(54) PROCESS AND APPARATUS FOR PRODUCING OLEFIN POLYMERS

(75) Inventors: Marianna Vuorikari, Hamari (FI); Esa Korhonen, Porvoo (FI); Henrik Andtsjö, Porvoo (FI); Samuli Zitting, Tuusula (FI)

(73) Assignee: Borealis Technology Oy, Porvoo (FI)

( * ) Notice: Subject to any disclaimer, the term of this patent is extended or adjusted under 35 U.S.C. 154(b) by 831 days.

(21) Appl. No.: 11/578,138

(22) PCT Filed: Apr. 29, 2005

(86) PCT No.: PCT/FI2005/000202

§ 371 (c)(1),
(2), (4) Date: Dec. 19, 2006

(87) PCT Pub. No.: WO2005/105862

PCT Pub. Date: Nov. 10, 2005

(65) Prior Publication Data

US 2008/0039597 A1  Feb. 14, 2008

(30) Foreign Application Priority Data

Apr. 29, 2004  (EP) .................................. 04396032

(51) Int. Cl.
*B01J 19/18*  (2006.01)
*C08F 2/00*  (2006.01)
*C08F 4/00*  (2006.01)
*C08F 4/12*  (2006.01)

(52) U.S. Cl. ........................... 422/132; 526/67; 526/64; 526/89; 526/90; 526/226

(58) Field of Classification Search ................. 422/132; 526/67, 64, 89, 90, 226
See application file for complete search history.

(56) References Cited

U.S. PATENT DOCUMENTS

2003/0050409 A1* 3/2003 Hottovy et al. ................ 526/64

* cited by examiner

*Primary Examiner*—William K Cheung
(74) *Attorney, Agent, or Firm*—Birch, Stewart, Kolasch & Birch, LLP

(57) ABSTRACT

The present invention concerns a process and an apparatus for continuous polymerisation of olefin monomers. In particular, the present invention concerns a process and an apparatus for continuous polymerisation olefin monomers like ethylene and other monomers, wherein an olefin monomer is polymerised in slurry phase in an inert hydrocarbon diluent in at least one loop reactor. According to the invention, a polymer slurry is continuously withdrawn from the loop reactor and concentrated. The concentrated slurry is conducted to a flash unit in order to remove the remaining fluid phase, and gas obtained is compressed in a flash gas compressor before it is being fed to a distillation section. By means of the present invention it is possible reduce the size of the flash gas compressor and the capacity of the distillation sections. This significantly reduces investment cost for a continuously operated polymerization apparatus.

27 Claims, 1 Drawing Sheet

PROCESS AND APPARATUS FOR PRODUCING OLEFIN POLYMERS

BACKGROUND OF THE INVENTION

1. Field of the Invention

The present invention relates to olefin polymerisation. In particular, the present invention concerns a process and an apparatus for continuous polymerisation olefin monomers like ethylene and other monomers, wherein an olefin monomer is polymerised in slurry phase in an inert hydrocarbon diluent in at least one loop reactor.

2. Description of Related Art

The loop reactor was developed in the 1950's. It is now widely used for the production of polyethylene and other olefin polymers. In a loop reactor, ethylene is polymerised in the presence of a hydrocarbon diluent in slurry phase at elevated pressure and temperature. The slurry is withdrawn from the reactor and concentrated so that the solids content at the reactor outlet is higher than the solids content in the reactor. Traditionally, this has been done by using settling legs. However, present methods for concentrating the polymer slurry of a loop reactor have been unsatisfactory. This is true, in particular, for the production of bimodal polyethylene in cascaded reactors.

The use of hydrocyclones for concentrating the outlet slurry of a loop reactor is known since the 1960's. Loop reactors equipped with a hydrocyclone are disclosed in, e.g., U.S. Pat. No. 3,816,383, where a part of the underflow from the hydrocyclone is taken to product recovery, while the residual part is combined with the overflow and returned to the loop reactor.

Another document relating to the above-mentioned topic is U.S. Pat. No. 4,395,523, which discloses a method of making and recovering polymer particles. The known method comprises polymerising in a loop reactor, directing a portion of the recirculating polymer slurry into a hydrocyclone, returning the overflow from the hydrocyclone into the reactor and withdrawing the underflow from the hydrocyclone and conducting it to product recovery.

Further, EP 1 118 624, EP 1 118 625 and EP 1 118 626 disclose a process for polymerising olefins, where the polymer slurry is directed from a loop reactor into a hydrocyclone. The underflow from the hydrocyclone is directed either to a subsequent polymerisation stage or to product recovery.

EP 891 990 discloses an ethylene polymerisation process comprising a continuous take-off of polymer slurry. The polymer slurry is continuously withdrawn from the loop reactor and fed to a high-pressure flash. From the high-pressure flash, the polymer is transferred into a low-pressure flash and from there to product recovery.

Even if the above documents describe different methods of withdrawing the slurry from the loop reactor, none of them discloses or suggests a polymerization method or apparatus, where the size of the separation units can be kept small compared to the product flows.

SUMMARY OF THE INVENTION

It is an aim of the present invention to eliminate disadvantages of the prior art and to provide a novel and economical process for producing olefin, in particular ethylene, homopolymers and copolymers.

The invention is based on the idea of essentially increasing the concentration of the polymer slurry before a flash unit so as to reduce the gas flow from the flash to a subsequent flash gas compressor. The effluent streams of the gas compressor are, as known per se, conducted to a separation zone, such as a distillation section comprising heavies column(s) and lights column(s). By means of the invention it is possible significantly to reduce the capacity and size of the gas compressor and of the subsequent distillation section.

Based on the above, the apparatus according to the invention comprises, in combination and preferably in a cascade, a loop reactor, means for increasing the concentration of polymer slurry withdrawn from the loop reactor, a flash unit, a flash gas compressor and a distillation section for recovering and recycling heavy and light components of the flash gas compressor. The means for increasing the concentration of the slurry can be located externally to the loop reactor. Alternatively, they can be arranged in conjunction with the reactor outlet, whereby the slurry can be concentrated when it is withdrawn from the reactor. The distillation section typically comprises in a cascade at least one heavies column for separating heavy components from the compressed gas of the flash unit, and at least one lights column for separating light components from the overhead product of the heavies column.

The process according to the invention for producing olefin polymers in a loop reactor, wherein at least one olefin monomer is polymerised in slurry phase in a hydrocarbon diluent or liquid monomer, comprises the following steps:

continuously withdrawing polymer slurry from the loop reactor, passing the polymer slurry to a separation device for polymer particles, such as a hydrocyclone, to provide a concentrated slurry and an overhead stream, recycling the overhead stream to the loop reactor, recycling a first part of the concentrated slurry to the loop reactor, conducting a second part of the concentrated slurry to a high pressure flash unit to separate the slurry into polymer and overhead gas, recovering the polymer from the flash unit, compressing the overhead gas stream in a flash compressor, passing the compressed flash gas stream into a heavies column in order to separate oligomers and other heavy components from the gas stream, passing at least a part of the overhead stream from the heavies column into a flash vessel in order to form a liquid phase and a vapour phase, and directing at least a part of the liquid phase of the flash vessel into a lights column in order to separate the low-boiling components from the liquid phase.

According to a preferred embodiment of the invention, the invention is applied to the polymerization of ethylene in a loop reactor.

More specifically, the process according to the present invention is mainly characterized by what is stated in the characterizing part of claim 1.

The apparatus according to the invention is characterized by what is stated in the characterizing part of claim 16.

The present invention provides important advantages. By means of the invention, an economical process can be achieved, since the size of the flash gas compressor can be reduced. Without the hydrocyclone the flash gas stream would include, in addition to the flash gas stream of the present examples, also 50% of the overhead stream from the hydrocyclone. Thus, the flash gas stream would be larger. Because the streams are smaller, the size of the separation units can be reduced. The invention provides for a smaller heavies column, lights column and comonomer column. Smaller process equipment means smaller investment costs.

Savings in the operation and running costs of the process can also be achieved. The energy consumption is reduced since recycle gas flows are smaller. This also means a more economical and environmentally friendly process.

Further details and advantages of the invention will become apparent from the following detailed description comprising a number of working examples.

DETAILED DESCRIPTION OF THE INVENTION

Overall Process

Figure 1:
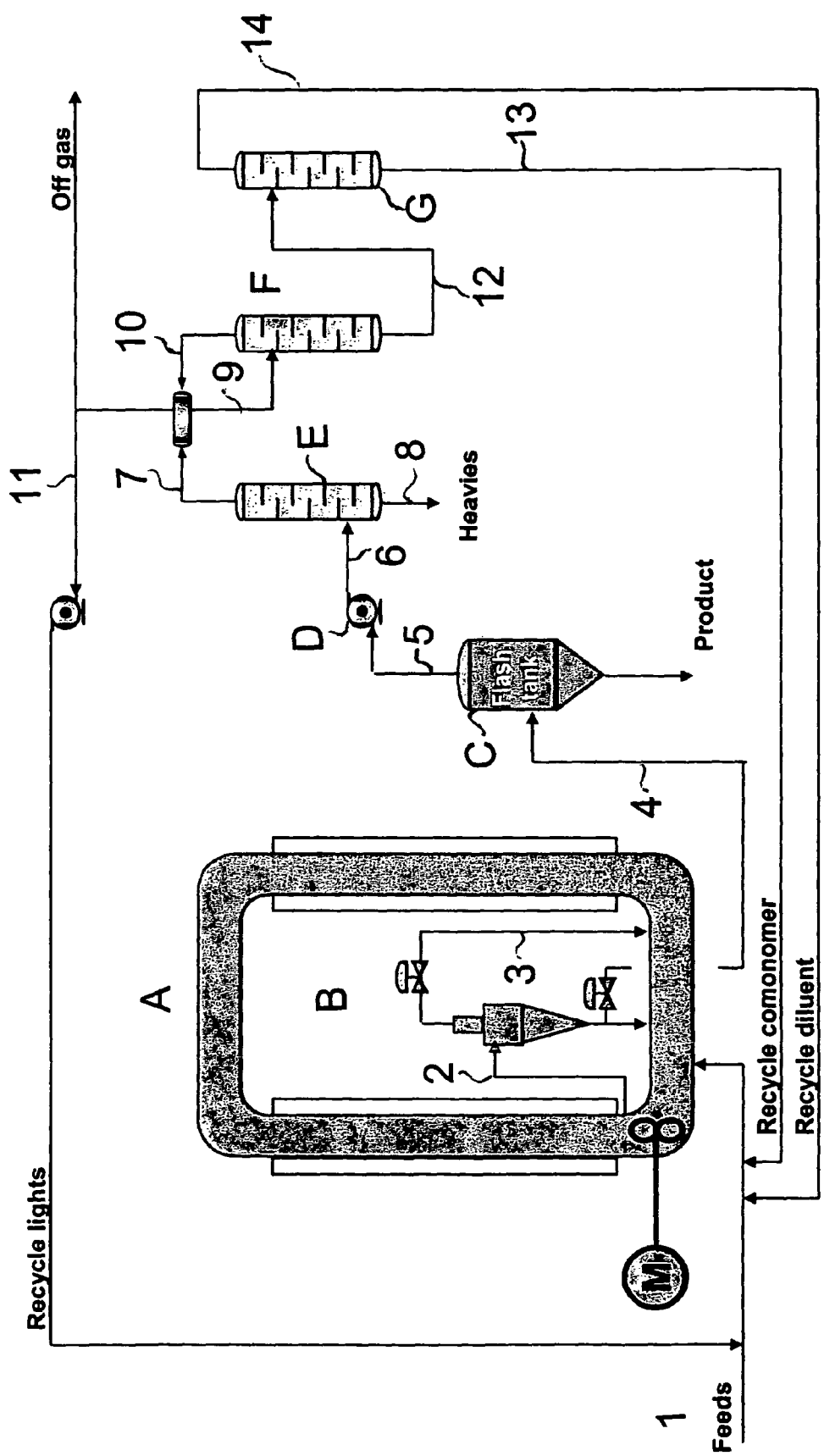
FIG. 1 depicts in a schematic fashion the process configuration of a first preferred embodiment of the invention.

The reference letters and numerals used in the attached drawing refer to the following pieces of equipment:

A. loop reactor

B. hydrocyclone

C. flash tank

D. diluent compressor

E. heavies column

F. lights column

G. comonomer column

H. flash and the following flows:

1. feeds 2. slurry to hydrocyclone 3. second product stream 4. first product stream 5. overflow from flash 6. compressed flash gas 7. gas stream 8. heavies stream 9. liquid stream 10. low boiling stream 11. vapour stream 12. bottom stream 13. recycle comonomer stream 14. recycle diluent stream Thus, as will appear from FIG. 1, olefin monomers, like ethylene and optionally one or more alpha-olefin comonomer(s), are polymerised in a loop reactor A in a hydrocarbon diluent, preferably propane or isobutane, in the presence of a polymerisation catalyst, optionally in the presence of hydrogen. The polymer slurry is continuously withdrawn from the loop reactor A through an outlet nozzle.

At least a part of the polymer slurry thus withdrawn is conducted to a hydrocyclone B, in which the slurry is concentrated to provide a first product stream 4 having a high concentration of solid matter and a second product stream 3, which mainly consists of hydrocarbon diluent separated from the polymer slurry. The first product stream forms the underflow of the hydrocyclone B and it is conducted to a flash unit C, which preferably is operated at a high pressure. The overhead flow comprising the second product stream of the hydrocyclone is recycled from the hydrocyclone B to the loop reactor A.

The product is recovered from the flash tank and conducted for drying, stabilisation and analysis. The overflow 5 is conducted into a diluent flash compressor. The compressed flash gas stream 6 is passed into a heavies column in order to separate oligomers and other heavy components 8 from the gas stream 7. The gas stream 7 from the heavies column is passed into a flash vessel H in order to form a liquid phase 9 and a vapour phase 11. At least a part of the liquid phase is conducted into a lights column in order to separate the low-boiling components 10 from the liquid phase. The low-boiling components are directed back into the flash vessel H. At least part of the vapour phase from the flash vessel 11 is directed into the recycle lights stream to be recycled into the loop reactor.

Optionally, the bottom stream of the lights column 12 is directed into a comonomer column G. At least part of the overhead stream from the comonomer column 14 is recycled into the loop reactor A. Optionally, at least part of the bottom stream of the comonomer column 13 is passed into the recycle comonomer stream in order to recycle into the loop reactor.

Next, the various steps of the process will be examined in more detail.

A. Loop Reactor

In the loop reactor 1, olefins like ethylene are homopolymerised or copolymerised with at least one $C_4$ to $C_{10}$ alpha-olefin. The polymerisation takes place in an inert hydrocarbon diluent or liquid monomer, preferably a $C_3$ to $C_5$ hydrocarbon diluent, more preferably in propane or isobutane diluent, and in particular propane diluent.

The temperature in the loop is from about 60° C. to about 110° C., preferably from 75 to 105° C. If ethylene or propylene is homopolymerised in the loop reactor, it is preferred to operate the loop reactor at conditions known as "supercritical", where the operating temperature exceeds the critical temperature of the reaction mixture and the operating pressure exceeds the critical pressure of the reaction mixture. At such conditions, the operation temperature is higher than 90° C., preferably higher than 93° C.

The operating pressure needs to be selected so that the contents of the loop reactor remain either in liquid state or supercritical state. For liquid slurry operation, the suitable range of operating pressure is from about 20 to about 100 bar, preferably from 25 to 75 bar. For supercritical slurry operation, the suitable range of operating pressure is from about 50 to about 100 bar, preferably from 55 to 80 bar.

Suitable catalysts that can be used to polymerise ethylene are, e.g., Ziegler-Natta catalysts, single-site catalysts, multi-site catalysts containing one or more single-site catalyst components, or combinations or mixtures of these.

The Ziegler-Natta catalyst comprises titanium and magnesium compounds, optionally also aluminium compounds, and may be supported on an inert support, such as silica or magnesium dichloride. Preferable catalysts are those that are disclosed in EP 688 794, EP 949 274, WO 99/58584 and WO 01/55230.

The single-site catalyst may be any catalyst that comprises one or more substituted or unsubstituted cyclopentadienyl ligands. Particularly useful are catalysts disclosed in WO 97/28170 and WO 00/34341.

Preferably, ethylene is (co)polymerised in the loop reactor in the presence of hydrogen to produce the low molecular weight polymer component. Typically, the reaction mixture contains from 0 to 10%, preferably from 0 to 4 mol-% of alpha-olefin comonomer. If a Ziegler-Natta catalyst is used, the reaction mixture typically contains from 2 to 10 mol-% hydrogen, preferably from 2 to 8 mol-%. If a single site catalyst is used, the reaction mixture typically contains from 0.01 to 1 mol-% hydrogen. Further, the reaction mixture contains typically from 1 to 10 mol-%, preferably from 3 to 10 mol-% ethylene. If a single site catalyst is used, then slightly lower ethylene concentration may be used. The reaction mixture further comprises the components of the diluent. Preferably, the major part of the diluent is propane, with minor quantities of other alkanes, such as methane, ethane, and butanes.

The concentration of the polymer in the reactor slurry is typically from 10 to 40% by volume, preferably from 20 to 30% by volume.

The polymer slurry is withdrawn from the loop reactor continuously through an outlet. The outlet may be placed at any suitable location in the reactor. However, most preferably the outlet is located at a suitable location downstream of the loop circulation pump. It is also possible to withdraw the slurry from the loop reactor in such a manner that the concentration of solids at the outlet is higher than the concentration of solids in the loop reactor. The slurry may be directed into the flash unit directly or through a further concentration step.

Pressure of the reactor is controlled by continuous withdrawal of the slurry from the reactor through an outlet nozzle. The said slurry can be directed to the hydrocyclone. In that case the pressure control valve is located in the product take off line of the hydrocyclone.

Performance of the hydrocyclone is highly dependent on the feed conditions. Any disturbance in the bottom flow will affect the performance of the hydrocyclone. The design can be made e.g. by allowing a wide controlling range for the feed flow. Stable operating conditions could then be reached by recycling a part of the slurry from the bottom of the hydrocyclone to the reactor.

The cut size of the particles can be adjusted e.g. by controlling the feed flow to the hydrocyclone.

Solids concentration at the bottom of the hydrocyclone can be measured and adjusted by adjusting the ratio of the recycle flow (overflow) and the product flow (underflow).

B. Hydrocyclone

From the loop reactor A the polymer slurry is directed to a hydrocyclone B, where the concentration of the slurry takes place by effect of centrifugal forces. The hydrocyclone divides the slurry flow into two streams: An overflow 3, which is rich in liquid, and an underflow 4, which is rich in polymer. The overflow is returned to the loop reactor or to a fines collection tank (not shown in the drawing) and the underflow is directed to a flash unit. A part of the underflow may be recycled back to the loop reactor As described above, the slurry entering the hydrocyclone has a solids content of 10 to 40% by volume. The solids concentration in the underflow can be adjusted by adjusting the ratio of the recycle flow (overflow) to the product flow (underflow), and is typically from 30 to 55% by volume, preferably 40 to 52% by volume. Thus, solids concentration is typically increased by at least 20%, preferably at least 50%, in particular at least 100%. It is often advantageous to recycle a part of the underflow back to the loop reactor.

The maximum solids concentration in the product flow is set by the limit of stable operation. If the solids concentration of the slurry is too high, the risk of plugging the product flow increases. For economical reasons, on the other hand, as high as possible solids concentration in the slurry is desired.

Typically, the ratio of recycle flow to product flow is from about 0.01 to about 10, preferably from 0.01 to 5 and more preferably from 0.1 to 2.

The ratio of the product withdrawal stream and the product recycle stream can be changed freely so that stable operation of both the hydrocyclone and the reactor is obtained. The amount of product returned back to the reactor can be 0-90%.

The solids concentration of the recycle flow is typically about 0 (or at least 0.001) to 5% by volume.

C. Flash Unit

The flash unit C typically consists of a heated flash pipe and a receiving vessel. The slurry entering the flash unit has a solids concentration of 30 to 60% by volume. In the flash unit, the remaining hydrocarbons are removed from the polymer. The flash pipe is preferably heated, e.g. by steam or water. If water is used for heating, the heating water can be advantageously taken from the jacket of the loop reactor. The temperature is selected according to the composition of the hydrocarbon fluid so that the fluid is essentially evaporated. The phrase "essentially removing the fluid phase" means that a major fraction of the fluid phase is removed and only an amount of fluid that fills the volume between the polymer particles and the volume of pores in the polymer particles remains with the polymer. Typically, the temperature at the receiving vessel is from 50 to 100° C., preferably from 60 to 90° C., in particular from 70 to 90° C., and a pressure of 10 to 30 bar, preferably 12 to 27 bar, and in particular from 14 to 24 bar.

The flash unit can also be operated as a low pressure flash. This means operation at a lower pressure, closer of even at ambient pressure. Pressures below 10 bar and preferably below 5 bar are suitable for low pressure flash.

At least a part of the overhead flow 5 from the receiving vessel of the flash unit is directed to a diluent compressor D in order to compress the stream.

D. Heavies Column

The compressed flash gas stream 6 is passed into a heavies column in order to separate oligomers and other heavy components 8 from the gas stream 7. The gas stream 7 from the heavies column is passed into a flash vessel H in order to form a liquid phase 9 and a vapour phase 11.

E. Lights Column

At least a part of the liquid phase 9 is conducted into a lights column in order to separate the low-boiling components 10 from the liquid phase. The low-boiling components are directed back into the flash vessel H. At least part of the vapour phase from the flash vessel 11 is directed into the recycle lights stream to be recycled into the loop reactor.

F. Comonomer Column (Optional)

Optionally, the bottom stream of the lights column 12 is directed into a comonomer column G. At least part of the overhead stream from the comonomer column 14 is recycled into the loop reactor A. Optionally, at least part of the bottom stream of the comonomer column 13 is passed into the recycle comonomer stream in order to recycle into the loop reactor.

A slurry reactor operated according to the present invention can be included in a multistage polymerisation sequence comprising one or several slurry reactor(s), which form a cascade with one or several gas phase polymerisation reactor (s), as disclosed in our copending patent application EP 02396161.8, the content of which is herewith incorporated by reference.

In the present context it is briefly noted that the gas phase reactors can be operated at a temperature of from about 60° C. to about 115° C., preferably 70 to 110° C. The operating pressure is from 10 to 30 bar, preferably from 15 to 25 bar. In the gas phase reactor, olefins are is copolymerised with one or more $C_2$ to $C_{10}$ alpha-olefin comonomers, or the olefins like ethylene are homopolymerised. Preferably, the olefins like ethylene are copolymerised in the gas phase reactor with a minor amount of hydrogen to produce a high molecular weight polyethylene copolymer. The reaction mixture contains typically from 5 to 25 mol-% ethylene, from 0.1 to 10 mol-% alpha-olefin comonomers and from 0.01 to 3 mol-% hydrogen. If a single site catalyst is used for ethylene polymerization, then the content of hydrogen may be from 0.001 to 1 mol-%. The remainder is composed of inert components, like nitrogen or propane.

The following non-limiting examples illustrate the invention:

EXAMPLES

Example 1

A 10 m³ loop reactor is operated at 95° C. and 60 bar pressure with propane diluent. Ethylene homopolymer is produced in the reactor by introducing ethylene, diluent, hydrogen and a polymerisation catalyst, which was prepared according to Example 3 of EP 688794 with the exception that as a carrier material silica having an average particle size of 20 μm is used, in such quantities that the diluent contains 5.9 mol-% of ethylene and 2.6 mol-% hydrogen. The remainder is propane with minor quantities (less than 1 mol-% each) of methane, ethane, isobutane and n-butane. The polymer production is 1.4 tons per hour; the melt index of the polymer is 450 g/10 min and the density 973 kg/m3 The solids content of the slurry is 25 vol-%.

The polymer slurry is withdrawn continuously from the reactor through an outlet nozzle and transferred to a hydrocyclone according to FIG. 1. The total slurry feed to the hydrocyclone is 5.5 tons per hour. The product flow is 3.7 tons per hour, with 52 vol-% of solids. The recycle flow is 1.8 tons per hour, with 1.7 vol-% solids. The recycle flow is returned to the loop reactor. The product flow is divided into two streams: The product withdrawal stream is about 1.8 tons per hour and the product recycle stream about 1.9 tons per hour. The product withdrawal stream is directed to hydrocarbon removal stage and the product recycle stream is returned into the loop reactor.

The product withdrawal stream of the hydrocyclone is routed via a heated pipe into a flash tank, operated at a temperature of 70° C. and a pressure of 20 bar. The hydrocarbons separated from the polymer are returned into the loop reactor via a diluent recovery at a rate of 0.3 tons per hour. They contain 5.9 mol-% of ethylene and 2.6 mol-% of hydrogen.

The polymer is directed to the product recovery for drying, stabilisation and analysis.

This example illustrates how economical the present process is: without a hydrocyclone, the flash gas stream would include in addition to the flash gas stream of the example also about 50% of the overhead stream from the hydrocyclone. Thus, the flash gas stream would be 0.5*1.8 t/h+0.3 t/h=1.2 t/h.

Example 2

Into the reactor of Example 1 is introduced ethylene, 1-butene, hydrogen and diluent, as well as similar catalyst to what was used in Example 1, so that the reaction mixture contains 6.8 mol-% ethylene, 3.1 mol-% 1-butene and 1.8 mol-% hydrogen. Polymerisation temperature is 85° C. The polymer production is 1.2 tons per hour, the melt index of the polymer is 200 g/10 min and the density 950 kg/m3. The solids content of the slurry is 25 vol-%.

The polymer slurry is withdrawn continuously from the reactor through an outlet nozzle and transferred to a hydrocyclone according to FIG. 1. The total, slurry feed to the hydrocyclone is 5.2 tons per hour. The product flow is 3.8 tons per hour, with 39 vol-% of solids. The recycle flow is 1.4 tons per hour, with 5.8 vol-% solids. The recycle flow is returned to the loop reactor. The product flow is divided into two streams: The product withdrawal stream is about 1.9 tons per hour and the product recycle stream about 1.8 tons per hour. The product withdrawal stream is directed to hydrocarbon removal stage and the product recycle stream is returned into the loop reactor.

The product withdrawal stream of the hydrocyclone is passed through a heated pipe into a flash tank, operated at a temperature of 70° C. and a pressure of 20 bar. The hydrocarbons separated from the polymer are returned into the loop reactor via a diluent recovery at a rate of 0.6 tons per hour. They contain 6.8 mol-% of ethylene, 3.1 mol-% of 1-butene and 1.8 mol-% of hydrogen.

The polymer is directed to the product recovery for drying, stabilisation and analysis.

The invention claimed is:

1. A process for producing olefin polymers in a loop reactor, wherein at least one olefin monomer is polymerised in slurry phase in a hydrocarbon diluent or liquid monomer, said process comprising
   polymerizing at least one olefin in a loop reactor in slurry phase,
   continuously withdrawing a polymer slurry from the loop reactor,
   increasing the concentration of the polymer slurry by separating it from an overhead stream,
   recycling the overhead stream to the loop reactor,
   recycling a first part of the concentrated slurry back to the loop reactor,
   conducting a second part of the concentrated slurry to a flash unit,
   recovering the polymer from the flash unit,
   compressing a first part of the overhead gas stream in a flash compressor,
   passing the compressed flash gas stream into a heavies column in order to separate oligomers and other heavy components from the gas stream,
   passing a second part of the overhead stream from the heavies column into a flash vessel in order to form a liquid phase and a vapour phase, and
   directing at least a part of the liquid phase into a lights column in order to separate the low-boiling components from the liquid phase.

2. The process according to claim 1, wherein at least a part of the bottom steam of the lights column is conducted into a recycle diluent stream which is recycled into the loop reactor.

3. The process according to claim 1, wherein at least a part of the vapour phase of the flash vessel is conducted into a recycle lights stream which is recycled into the loop reactor.

4. The process according to claim 1, wherein the bottom stream of the lights column is conducted into a comonomer column and at least a part of the overhead stream from the comonomer column is conducted into the loop reactor, whereas at least a part of the bottom stream of the comonomer column is conducted into a recycle comonomer stream for recycling into the loop reactor.

5. The process according to claim 1, wherein the solids content of the concentrated slurry is 30 to 55% by volume.

6. The process according to claim 1, wherein 10-90% of the concentrated slurry is recycled to the loop reactor and a second part of concentrated slurry is conducted to the flash.

7. The process according to claim 1, wherein the slurry is concentrated in a hydrocyclone to provide an underflow, which comprises the concentrated slurry, and an overflow, which is rich in hydrocarbon(s).

8. The process according to claim 1, wherein the slurry is withdrawn from the loop reactor in such a manner that the concentration of solids at the outlet is higher than the concentration of solids in the loop reactor.

9. The process according to claim 8, wherein the overflow is recycled to the loop reactor.

10. The process according to claim 9, wherein the ratio of the recycled overflow to the underflow withdrawn from the hydrocyclone is 0.01 to 10.

11. The process according to claim 8, wherein the solids concentration of the slurry of the overflow is 0.001 to 5% by volume of the flow.

12. The process according to claim 1, wherein the flash unit comprises a flash pipe, which is optionally heated, in which the remaining hydrocarbons of the concentrated slurry are at least partly evaporated to form an overflow containing the evaporated fluid phase, and a receiving vessel to form an overflow containing the evaporated fluid phase and a product flow containing the polymer particles and a minor amount of the fluid phase.

13. The process according to claim 1, wherein the product flow from the flash unit contains less than 0.1 mol-% of hydrogen.

14. The process according to claim 1, wherein the monomer is ethylene, which is optionally copolymerised with one or more $C_4$ to $C_{10}$ alpha-olefins.

15. The process according to claim 1, wherein the catalytic system comprises a Ziegler-Natta catalyst, single site catalyst, multi site catalyst or a combination or mixture of the above.

16. An apparatus for producing an olefin polymer in the presence of a catalytic system comprising
  a loop reactor,
  a separation device for increasing the solids content of the slurry withdrawn from the loop reactor to provide a concentrated slurry,
  a flash unit for essentially evaporating all of the remaining liquid-phase hydrocarbons of the slurry phase diluent to provide a gas/solids mixture containing polymer solids gases,
  a flash gas compressor connected to the outlet of the flash unit for compressing at least a part of the overhead gas of the flash unit, and
  a distillation section for recovering and recycling heavy and light components of the overhead gas of the flash unit.

17. The apparatus according to claim 16, wherein the separation device for increasing the solids content of the slurry comprises a hydrocyclone.

18. The apparatus according to claim 16, wherein the distillation section is connected to the outlet of the flash gas compressor.

19. The apparatus according to claim 16, wherein the distillation section comprises, in a cascade, at least one heavies column for separating heavy components from the compressed gas of the flash unit, and at least one lights column for separating light components from the overhead product of the heavies column.

20. The apparatus according to claim 16, comprising in combination
  a loop reactor for polymerising olefin monomer in slurry phase in a reaction mixture comprising fluid hydrocarbons and optionally hydrogen and polymer particles and provided with at least one outlet to allow for continuous withdrawal of polymer slurry,
  at least one hydrocyclone having at least one inlet for the polymer slurry and at least one first outlet for concentrated slurry and at least one second outlet for an overhead flow, said inlet being connected to the outlet of the loop reactor, and said hydrocyclone being adapted to separate the fluid phase from the polymer slurry to provide a concentrated slurry,
  a flash unit having at least one inlet for the slurry and at least one first outlet for a suspension of polymer solids and gases and at least one second outlet for evaporated fluid phase, said inlet being connected to the first outlet of the hydrocyclone, and said flash unit being adapted to separate the fluid phase from the concentrated slurry,
  a flash gas compressor connected to the second outlet of the flash unit for compressing at least a part of the overhead gas of the flash unit, said compressor having an outlet for the compressed flash gas,
  at least one heavies column for separating heavy components, having an inlet for compressed gas connected to the outlet of the compressor, and having a first outlet for an overhead product and a second outlet for a bottom product, and
  at least one lights column connected to the first outlet of the heavies column for separating light components from the overhead product.

21. The apparatus according to claim 16, further comprising a comonomer column connected to the outlet of a bottom stream of the lights column.

22. The apparatus according to claim 16, wherein the comonomer column comprises an outlet for an overhead stream which is connected to a recycle line to the loop reactor.

23. The apparatus according to claim 16, wherein the flash is a high pressure flash.

24. The apparatus according to claim 16, wherein the outlet of the loop reactor is placed at a suitable location downstream of the loop circulation pump.

25. The process according to claim 1, wherein the solids content of the concentrated slurry is 40 to 52% by volume.

26. The process according to claim 9, wherein the ratio of the recycled overflow to the underflow withdrawn from the hydrocyclone is 0.01 to 5.

27. The process according to claim 9, wherein the ratio of the recycled overflow to the underflow withdrawn from the hydrocyclone is 0.1 to 2.

* * * * *